(No Model.)
J. UNDERKOFLER.
ANIMAL STOCK.
No. 490,053. Patented Jan. 17, 1893.
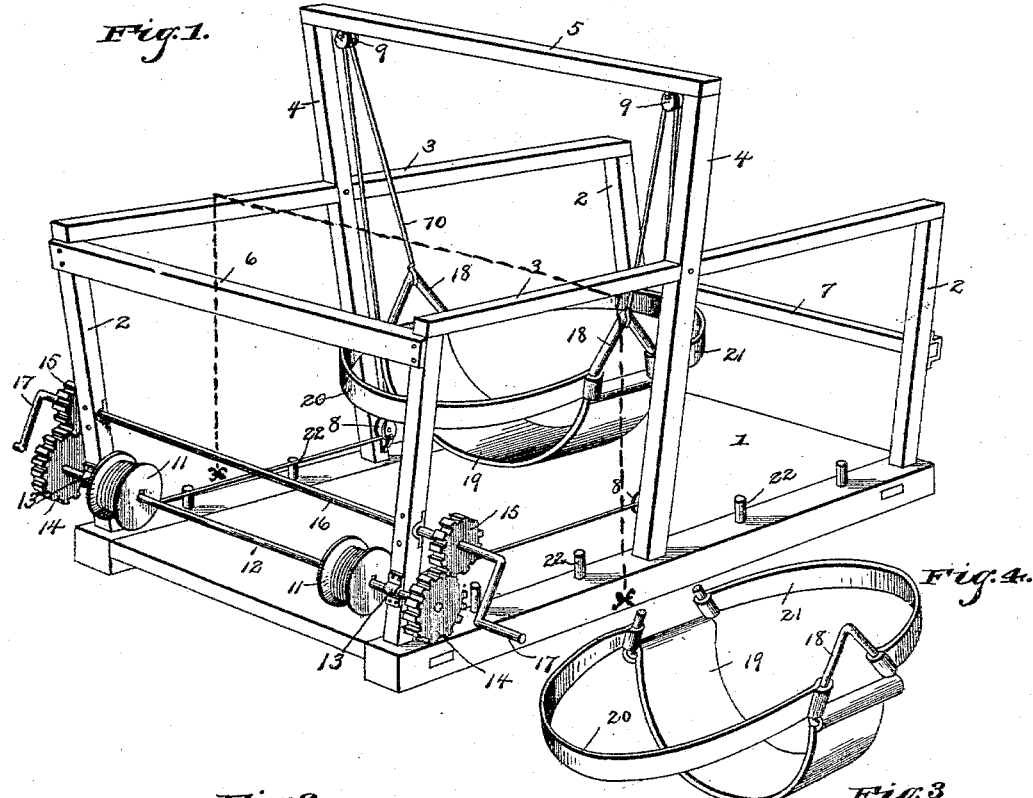
Witnesses
B.S. Ober
Inventor
Jesse Underkofler
By his Attorneys,
Chas. S. Hyer, C.A. Snow & Co.

UNITED STATES PATENT OFFICE.

JESSE UNDERKOFLER, OF BELMOND, IOWA.

ANIMAL-STOCK.

SPECIFICATION forming part of Letters Patent No. 490,053, dated January 17, 1893.

Application filed May 3, 1892. Serial No. 431,716. (No model.)

*To all whom it may concern:*

Be it known that I, JESSE UNDERKOFLER, a citizen of the United States, residing at Belmond, in the county of Wright and State of Iowa, have invented a new and useful Animal-Stock, of which the following is a specification.

This invention relates to animal stocks, and consists of the novel arrangement of parts as will be more fully hereinafter described and claimed.

The object of this invention is to provide means by which fractious or nervous animals are held elevated for shoeing, or sick animals suspended for medicinal purposes, the parts of the same being simple and effective in their construction and operation and avoiding undue noise or sound during the elevation of the animal, whereby aggravation and excitability of the animal is prevented.

In the drawings—Figure 1 is a perspective view of a stock embodying the improvement. Fig. 2 is a front end elevation. Fig. 3 is a cross-sectional view on the line x—x, Fig. 1. Fig. 4 is a detail perspective view of the sling.

Similar numerals of reference indicate corresponding parts in the several views.

Referring to the drawings, the numeral 1 designates a bed or base, having end uprights 2 at the front and rear portions thereof, connected by longitudinally-disposed strips or bars 3, and 4 are standards or uprights rising from the bed or base 1 and connected to and extending above the bars or strips 3 with a cross-strip or beam 5 connecting the upper ends thereof. The front uprights 2 are connected by a cross-bar 6, and the rear end uprights are adapted to receive the removable bar 7. The standards 2 and 4 are arranged at a slight angle of inclination to the perpendicular to compensate for the width of the body of an animal, as will be readily understood.

The device thus far described forms a stall, which may be transported from one position to another and is in all respects made strong and durable and sufficiently reinforced to support animals varying in weight.

The lower inner portions of the uprights 4 have pulleys 8 secured thereto, and from the under side of the cross-strip or beam 5 depend other pulleys 9, through which are passed ropes 10, running from drums 11 keyed to a shaft 12, extending transversely across and journaled in boxes 13, secured to the front uprights 2. On the opposite projecting ends of the said shaft 12 are secured gears 14, which mesh with pinions 15 above the same. The pinions 15 are keyed to a shaft 16, running parallel with the shaft 12, and having cranks or handles 17 on the ends thereof, by means of which the gears 14 are operated to turn the drums 11, as will be readily understood.

The ends of the ropes or cables 10 are first passed through pulleys 8 and then carried upward and extended through the pulleys 9, where the ends of the same are secured to triangular-shaped yokes 18, to which are connected the opposite ends of an extended or broadened girth 19. This girth 19 is sufficiently long as to engage the whole of the underportion of the body of an animal therein in order that an easy and safe suspension may be effected. From the front portion of the yoke 18 extends a breast-strap 20, which is applied to the animal in the same manner as the breast-strap of harness and may be supplied with suitable buckles or fastening means as found desirable. To the rear of the yokes is secured a breeching-strap 21, which is fitted over the rear portion of the animal, as will be understood, and may be also supplied with suitable buckles for fastening or adjustment of the same.

Connected to the base 1 are a series of pegs or posts 22, at the rear and front which receive straps to secure the legs of the animal thereto, and to provide means for arranging the hoof in convenient position for the purpose of shoeing the same. By means of these pegs or posts movement of the limbs of the animal is prevented and the serious results of kicking obviated.

The animal to be suspended is driven in at the rear open end of the stall and an end-bar, as 7, is connected to the rear standards or uprights 2. The girth 19 is then slipped under the body of the animal and the breast-strap and breeching-strap are arranged in proper position. If the animal should resist, he would be prevented from disengaging himself from the girth by the breeching and breast straps described. When the parts of the sling, which is composed of the girth and straps set forth, are properly adjusted, the ropes 10 are slowly wound upon the drums 11 by the mechanism herein set forth and the animal gradually and noiselessly suspended or elevated. His feet or legs may then be readily secured against kicking, and the shoe may be readily applied. In administering medicine to an animal, this device is equally efficient, and by reason of the absence of chains and creaking parts, aggravation and nervousness of the animal are obviated and prevented.

Having thus described the invention, what is claimed as new is—

In an animal stock, the combination of a frame simulating a stall and having centrally-disposed uprights extending above the upper portion of the stall and connected by a cross-piece, pulleys secured to said uprights and to said cross-piece, a sling composed of triangular-shaped yokes to whose apices are secured ropes or cords running through the pulleys connected to said cross-piece and then downward through the pulleys connected to the uprights, a girth connected to the horizontal portion of each of said triangular yokes, and a breast-strap and breeching attached to the front and rear angular sides of said yokes above the said girth, a windlass in the front of the stall on which the said ropes or cords are adapted to be wound, a removable cross-bar at the rear of the stall, and upwardly-projecting pegs supported by the side-bars of the base of the stall and located in front and rear of the said uprights, substantially as described.

In testimony that I claim the foregoing as my own I have hereto affixed my signature in the presence of two witnesses.

JESSE UNDERKOFLER.

Witnesses:
W. H. PIERCE,
I. V. EARHEART.